United States Patent
Earl et al.

(10) Patent No.: US 9,743,301 B1
(45) Date of Patent: Aug. 22, 2017

(54) SYSTEMS AND METHODS FOR MAINTAINING A TELECOMMUNICATIONS NETWORK USING REAL-TIME SQL ANALYSIS

(71) Applicant: Sprint Communications Company L.P., Overland Park, KS (US)

(72) Inventors: Bryson Earl, Altamonte Springs, FL (US); Seth Shelnutt, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/058,147

(22) Filed: Mar. 1, 2016

(51) Int. Cl.
*H04W 24/08* (2009.01)
*H04L 12/26* (2006.01)
*H04W 88/08* (2009.01)

(52) U.S. Cl.
CPC ......... *H04W 24/08* (2013.01); *H04L 43/0888* (2013.01); *H04W 88/08* (2013.01)

(58) Field of Classification Search
CPC ..... H04W 24/02; H04W 24/08; H04W 24/04; H04W 24/10; H04W 28/0236; H04W 64/00; H04W 28/08; H04W 28/16; H04W 28/0247; H04W 28/18; H04W 28/02; H04W 72/02
USPC ............ 455/67.11, 67.14–67.7, 115.1–115.4, 455/226.1–226.4, 423–425; 370/241.1, 370/242, 252, 253; 707/688; 702/179–185
See application file for complete search history.

(56) References Cited

U.S. PATENT DOCUMENTS

| | | | | |
|---|---|---|---|---|
| 2012/0157089 A1* | 6/2012 | Yang | ................... | H04L 12/2464 455/424 |
| 2012/0295609 A1* | 11/2012 | Li | ......................... | H04W 24/04 455/423 |
| 2014/0269364 A1* | 9/2014 | Knapp | .................. | H04W 84/18 370/252 |
| 2014/0357259 A1* | 12/2014 | Tomeczko | ............ | H04W 24/04 455/423 |
| 2015/0065122 A1* | 3/2015 | Futaki | ................... | H04W 24/04 455/424 |

* cited by examiner

*Primary Examiner* — Allahyar Kasraian

(57) ABSTRACT

Systems and methods discussed herein provide for real-time and near-real-time analysis of performance for cell towers in order to determine when a cell tower is underperforming in order to perform corrective action before underperformance becomes an increased maintenance and/or service concern. Data is received at periodic intervals from a plurality of cell towers and a plurality of scripts are executed on the data as it is received in order to analyze key performance indicators associated with each tower. The received data is analyzed using real-time data and in some cases by applying the real-time data to a previously developed model to determine if a cell tower is underperforming based on at least one key performance indicator associated with that cell tower.

19 Claims, 3 Drawing Sheets

SYSTEMS AND METHODS FOR MAINTAINING A TELECOMMUNICATIONS NETWORK USING REAL-TIME SQL ANALYSIS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications service providers may maintain a communication network over a wide geographic area. This enables a large number of mobile telecommunication devices such as mobile phones, smart phones, personal digital assistants and tablet computers to communicate with each other in the cellular network. The cellular network is distributed over land areas called cells, each served by one or more cell towers.

SUMMARY

In an embodiment, a method for maintaining a cell tower, comprising: updating, by an application stored in a non-transitory memory of a server and executable by a processor, a short term table, by storing a plurality of data received from each cell tower of a plurality of cell towers, wherein each of the received pluralities of data is associated with a performance metric and stored as an entry in the short term table, wherein at least some performance metrics are associated with a key performance indicator (KPI) for a cell tower of the plurality of cell towers; initiating, by the application, a first statistical analysis of at least some of the pluralities of data in the short term table, wherein initiating the first statistical analysis comprises assigning a state to each entry stored in the short term table, wherein the first statistical analysis is initiated in the short term table; and updating, by the application, the short term table during the first statistical analysis, wherein at least some of the updated data replaces data stored in the short term table after first statistical analysis is initiated. The embodiment further comprising: completing, by the application, the first statistical analysis, during the updating of the short term table; identifying, by the application, based on the completion of the first statistical analysis, at least some metrics for a second analysis; performing, by the application, the second statistical analysis on the at least some KPIs identified; performing, by the application, based on the second statistical analysis, a third statistical analysis on at least one KPI of the at least some KPIs using a model, wherein the model is generated based on a long term table, wherein the long term table comprises data associated with the plurality of cell towers; determining, by the application, based on the third statistical analysis, when the cell tower associated with the at least one KPI is underperforming; and executing, in response to a determination that the cell tower is underperforming, at least one control action.

In an embodiment, a system for maintaining a cell tower, comprising: a server; a non-transitory memory of the server; a processor; and an analysis application stored in the non-transitory memory and executable by the processor to: store pluralities of performance data from each of a plurality of cell towers as entries in a short term table, wherein the pluralities of performance data are associated with a plurality of performance metrics of the plurality of cell towers expire a predetermined amount of time after being stored, and wherein at least some of the plurality of performance metrics are associated with a key performance indicator (KPI) of a cell tower of the plurality of cell towers; initiate a first statistical analysis on at least some of the pluralities of performance data; update, after the first statistical analysis is initiated, the short term table during the first statistical analysis at the predetermined intervals, wherein at least some of the updated short term table is analyzed during the first statistical analysis, and wherein at least some of the updated data replaces data stored in the short term table when the first statistical analysis is initiated; complete, during the updating of the short term table, the first statistical analysis; and determine, based on the first statistical analysis, a subset of the plurality of performance metrics. The embodiment further comprising wherein the application is configured perform, subsequent to the completion of the first statistical analysis, a second statistical analysis on the subset of the plurality of performance metrics; perform, based on the second statistical analysis, a third statistical analysis on at least one performance metric of the subset of the plurality of performance metrics using a model previously generated for the at least one performance metric; determine, based on the third statistical analysis, if the cell tower associated with the at least one performance metric is underperforming; and execute, in response to a determination that the cell tower is underperforming, at least one control action.

In an embodiment, method for maintaining a cell tower, comprising: performing, by an application stored in a non-transitory of a server and executable by a processor, a first statistical analysis on a plurality of data stored in a short term table on the non-transitory memory, wherein the application executes on the short term table, and wherein the plurality of data comprises key performance metrics associated with cell tower performance of a plurality of cell towers; determining, by the application, based on the first statistical analysis, a subset of the performance metrics; performing, by the application, a second statistical analysis on the subset of the performance metrics, wherein the short term table receives additional pluralities of data during the second statistical analysis; and performing, by the application, based on the second statistical analysis, a third analysis on at least one KPI of the subset of KPIs using a model associated with the at least one KPI wherein the model is generated based on a long term table, wherein the long term table comprises a plurality of data associated with cell tower performance of a cell tower associated with the at least one KPI. The embodiment further comprising determining, by the application, based on the third statistical analysis, if the cell tower associated with the at least one KPI; and executing, by the application, in response to a determination that the cell tower is underperforming, at least one control action.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
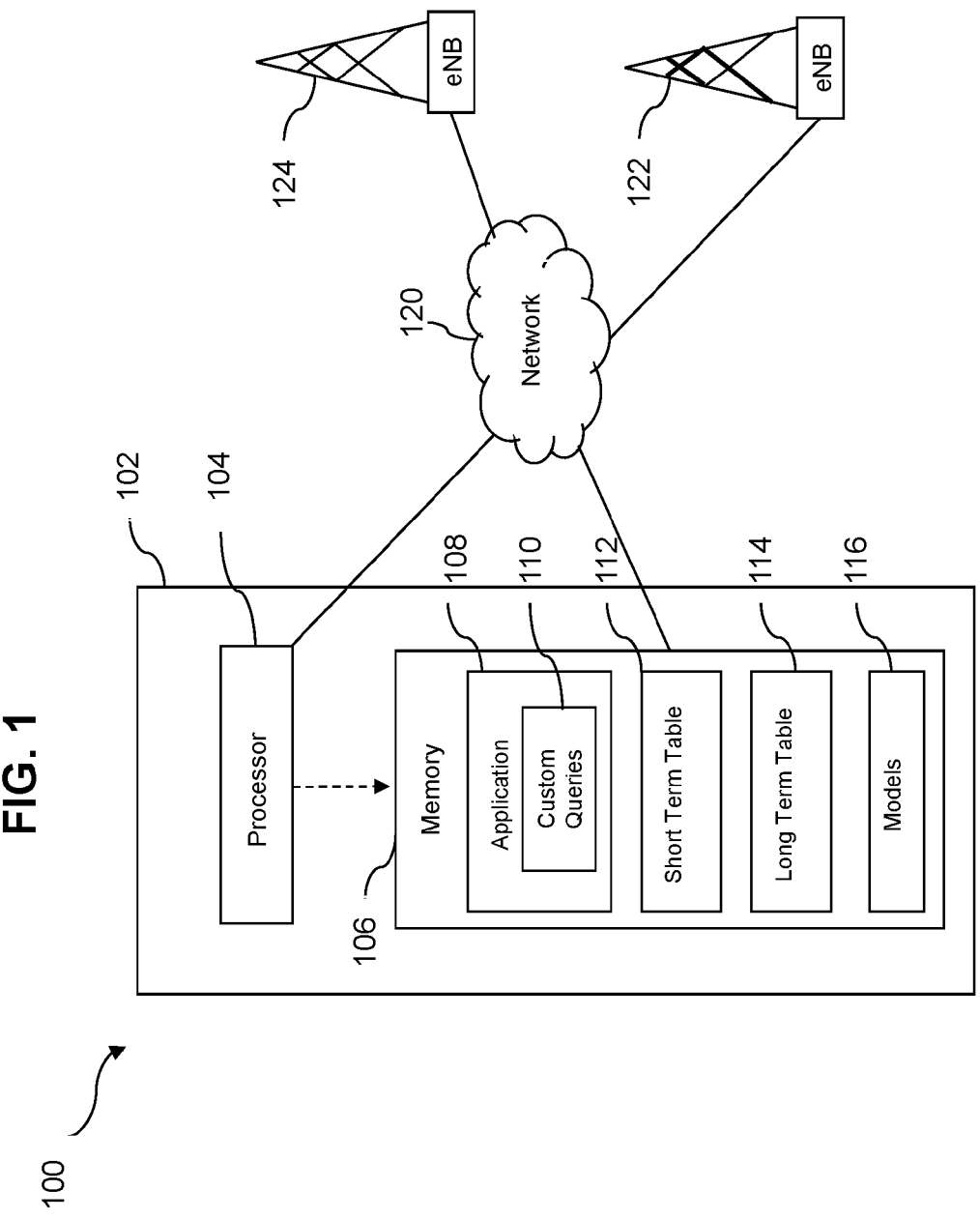
- FIG. 1 illustrates a system configured to maintain telecommunications services by detecting and responding to underperforming towers in real time.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A telecommunications service provider may employ 25,000-50,000 cell towers, or more, in order to support a cellular network. Each tower may operate in a different area that may experience different levels of traffic during different times of day, days of the week, during special events, or at different times of year. Each cell tower operates using at least one technology, such as Code Division Multiple Access (CDMA) technology, Long Term Evolution (LTE) technology, WiMax, Global System for Mobile Communications (GSM), or combinations thereof. Telecommunications service providers have a vested interest in ensuring that towers function as designed so that they are able to provide service to customers. Part of ensuring service to customers may comprise preventive maintenance as well as determining when a cell tower is underperforming so that it can be determined if this is an anomaly or if it is desirable to repair or otherwise address the cell tower's function. An anomaly may be an event that would cause a performance metric or metrics associated with a cell tower to be outside of a predetermined variation, these anomalies may include events that draw attendees and therefore cell tower usage to towers that may not normally have levels of traffic or other associated metrics equivalent to those observed at a large-scale event. As discussed herein, the "underperformance" of a cell tower may refer to a scenario in which a cell tower is determined to be operating outside of a predetermined range of performance for at least one metric from a plurality of metrics measured for each cell tower. The plurality of metrics may be used alone or in combination to determine key performance indicators (KPI), associated with each cell tower, as discussed in detail below. A KPI for a first cell tower may be based upon different metrics than a KPI for a second tower, and performance ranges for the associated metrics for each tower may be determined based upon the data received for that tower. It is appreciated that ranges for metrics for different towers may comprise operational ranges and variation (standard deviations) that vary and that may sometimes overlap among and between towers.

It may be challenging for a telecommunications service provider to determine cell tower underperformance that may result in service problems experienced by the user and/or a more serious failure of all or part of the cell tower. This challenge may be due to the number of cell towers being monitored and because the cell towers are in constant use, which means that data is being continuously collected and transmitted to the telecommunications service provider. One method of maintaining the cell towers involves copying data from a database that stores a plurality of information received about cell tower function and transferring this data to a static database for analysis. The performance of the cell towers is then determined based on the statistics of the data in the static table. However, copying the data may take tremendous amount of time, for example, a few hours, so there is a time delay between the data collection and analysis. This time delay may not provide an accurate picture of tower performance at least because the time lag inhibits the ability to detect when data is an anomaly and not a reflection of underperformance of the cell tower.

Using the systems and methods discussed herein, the key performance indicators (KPIs) for each cell tower of a plurality of cell towers may be determined, as well as a threshold for each KPI that may be used in a first step to determine whether the cell tower is functioning properly. As discussed herein, the "proper function" of a cell tower occurs when the cell tower functions in a capacity where it supports cellular and data services within predetermined ranges or thresholds of the metrics measured, and the underperformance of a cell tower may also be described as when this proper function is not in effect.

According to certain embodiments of the present disclosure, non-atomic operations are executed in a SQL database that is being continuously updated at predetermined intervals when data is received from a plurality of cell towers. Atomic operations may comprise read-modify-write operations or loads and stores where a sequence of operations (machine instructions) may be executed uninterrupted and in sequence. Sequences of two or more machine instructions are not inherently atomic since the execution may be suspended in favor of other tasks, e.g., updating or modifying the data on which the operation is executing. Operations that execute on shared memory may be referred to as atomic operations if the execution is completed in a single step as compared to other threads. When atomic operations are performed on variables that may be shared by other executing threads, the entire value of the variable is read as it is at a single moment in time, which enables lock-free programming. Atomic and non-atomic threads may execute simultaneously on the same or overlapping sets of data, but if either thread uses a non-atomic operation, a data race may occur that may result in corrupted, incorrect, or incomplete reads and/or writes. Using the systems and methods discussed herein, the operations performed in the SQL database while the database continues to update appear that the operations are atomic when the operations are in fact non-atomic.

The systems and methods discussed herein comprise the execution of custom SQL statements in a SQL database to determine if a cell tower is underperforming and if a control action is to be executed on one or more cell towers. These custom SQL statements, which may be collectively referred to as an application, are executed while the database (which may be referred to as a short term database) continuously receives updates to rows of data associated with the performance of a plurality of cell towers. It is appreciated that the execution of non-atomic SQL statements in an SQL database that is continuously updating, may be inherently challenging because data that is updating may be missed or modified underneath the execution of the SQL statements, so the analysis may be flawed since it did not take into account the updated data. In some cases, SQL databases can also end up out of sync. Using the systems and methods discussed herein, a state may be associated with each row of the SQL database to indicate whether the row has been examined by an executing custom sequence, has not been examined, has been modified since examination (data changed), or has been deleted (entire row deleted). The state may be expressed as a number, letter, alphanumeric sequence, symbol, or combination thereof, and may be reset as discussed herein. In one example, an unexamined row may be identified by a "0," an examined row by a "1," a modified row by a "2," and a deleted row with a "3."

In an embodiment, each cell tower of a plurality of cell towers collects data for a variety of variables associated with its function. This data may be analyzed by an application to identify the key performance indicator (KPIs) and associated metrics that have the greatest impact on the performance of each cell tower. These KPIs may be associated with performance indicator metrics such as dropped calls, failure connection rates, set up time, throughput of handset, and throughput of backhaul (e.g., from cell towers to core networks, call block rates, etc.). Additional metrics may comprise power, frequency allocations, antenna tilt, and other functional and operational aspects of cell tower function. In some embodiments, dropped calls, failure connection rates, set up time, throughput of handset, and throughput of backhaul may comprise functions of one or more metrics measured using data from the plurality of cell towers.

These metrics may differ from cell tower to cell tower because of the differences in loads and in the consistency in loads between cell towers in urban and rural environments, downtown and suburbs, event venues and vacation destinations, residential areas, and business areas. These varying environments and the cell tower or towers associated with the environments may experience anomalies in performance during, for example, weekdays, rush hour, concerts, summer and holiday vacations, and other seasons or times of day. These anomalies are discussed herein as they apply to the analysis performed using the systems and methods discussed herein to identify underperforming towers. As discussed herein, an "underperforming tower" may be a cell tower that is not functioning as intended based upon the statistical analysis and anomaly considerations discussed herein, underperformance may indicate a potential greater failure in the future. The underperforming towers identified may be in need of maintenance or repair, which may include downtime, and the downtime may be reduced by early identification of underperformance.

In an embodiment, in a first step, application first table receives data from each of a plurality of towers at predetermined intervals. The predetermined intervals may or may not be consistent across times of day, days of the week, and seasons. In this example, a plurality of KPIs for each cell tower was previously determined based on an aggregation of data. The data received by the first table is aggregated after a first time period. For example, data may be received over a 7-day period and aggregated on the $8^{th}$ day for analysis to determine if any of the cell towers may be in need of repair or further investigation. This data may be received from the cell towers in intervals of 5, 10, or 15-minutes, or in another interval of time as appropriate. In a second step, a first test such as a z-test may be performed on a predetermined set of data, for example, a data set from the previous 7 days stored in the short term table. This z-test is a hypothesis test based on a z-statistic determined based on the standard normal distribution under the null hypothesis. The z-test is employed to analyze the 7-day mean of a normally distributed population of data with a known variance, the known variance may be derived from the long term table discussed below, and is determined prior to performing the z-test and may be recalculated at predetermined intervals.

In this example, if the results of the z-test indicate that a metric for a particular tower is outside of a predetermined threshold for that metric for the cell tower based on the historic values, a power test may be done in a third step. The power test may be performed to account for non-anomalies, that is, to determine if the failure of the z-test was due to an anomaly. For example, if a metric including but not limited to a KPI from Tower 58 is determined to be outside of a predetermined range/variation based on the z-test, the power test determines if this variable may be outside of a predetermined threshold while taking into account anomalies. In one example, a metric that is flagged after a z-test as being out of a known variance may be due to increased tower activity because of a sporting event or other festival near Tower 58, which is located in a rural area where there may not typically be high demand for service. The power test is intended to catch this type of variance anomaly and to determine that the cell tower in question may not be underperforming, so as to not erroneously take action including deploying resources or altering the function of the cell tower in order to perform further analysis or repair.

In a fourth step, if the metric fails the power test, a model generated from a second database that may be referred to herein as a long term database, data store, or table, may be employed to further determine if the metric is indicative of a cell tower deviating from the expected performance. While the terms "short term" and "long term" term are used to describe two tables that may be used in the systems and methods discussed herein, it will be appreciated that the tables are so named because of the length of time, and more specifically the relative lengths of time, that data is stored in each table before it expires and is removed from that table. The power test may be employed to take a second look at data if one or more metrics fail the z-test, this test may be performed on the short term table but may compare specific times, times of day, or ranges or times and times of day to determine if the z-test failure may be due to expected variation. For example, if every weekday during a certain time period, a plurality of cell towers experience a higher demand for service than on weekends during that time, the data for those cell towers during that time period (e.g., rush hour), may not be indicative of tower underperformance. In contrast, if cell towers in a particular geographic location do not historically experience this sort of variation due to the time or day or the day of week, the power test may indicate as such and that further analysis to determine cell tower underperformance is desirable.

In an embodiment, the first steps of the analysis, e.g., the z-test and the power test, are performed using a first database which may be referred to as a short term table. The short term table comprises data from the plurality of cell towers sent during a predetermined period, for example, 7 days. The short term table is continuously updating, e.g., receiving data from a plurality of towers, even while the non-atomic SQL operations on the data are executing within this short term table. During the z-test and the power test, a state of each entry is analyzed by the executing operations. The "state" of each entry comprises an indication as to whether each entry (row) has been analyzed in the instant analysis, is unanalyzed, has been modified since the analysis began, or has been deleted. These states may be reset by the application depending upon the stage of the analysis and the continuous updating of the short term table. In an embodiment, the application writes to the state as the data is analyzed row by row.

Turning back to the fourth step, the data copied from the short term table to the long term table is stored for a longer period of time in the long term table before expiring than the data stored in the short term table. Once data (entries/rows) expire from the short term table, they may be removed from that table, and entries may expire in a similar fashion from the long term table. In one example, the data in the long term table is transferred from the short term table once it expires from the short term table, and stored in the long term table for 30 days. The expiration period for data in the short term table may comprise a 7 day, 10 day, 14 day, or another expiration period that is less than the expiration period for the data transferred into the long term table.

In an embodiment, the long term table may be analyzed to determine a series of models, where each model is associated with statistically normal behavior of at least one metric for a particular cell tower. A model may be determined for each metric associated with a cell tower, and/or for combinations of metrics (e.g., KPIs), associated with each cell tower, and each model may comprise different parameters depending upon the associated cell tower's location and configuration. The models discussed herein may comprise first order models based on a forward stepwise regression analysis where inputs with the highest correlation and weight are determined. Models may be developed for each KPI for each cell tower, and data from the short term table (e.g., from the current data segment) may be put into the model and a z-test performed on the results to determine if the tower is underperforming. In an embodiment, at some fixed point and time for example 2-4 weeks, each model is recomputed to determine what input parameters/data are appropriate for each model and to potentially come up with a new model and determine new or additional input columns or parameters.

In the fourth step, the inputs used for the first z-test and the power test are input into the model and a z-test is performed on the results. If the z-test fails, a control action may be executed.

In an embodiment, control actions may comprise: sending a notification to an administrator, repair department, or third party vendor that the cell tower is underperforming, changing a flag associated with cell tower performance to indicate that the cell tower is underperforming and/or what other control actions have been executed. In some embodiments, the control actions may comprise taking action to dispatch or notify an on-site team, or modifying the performance of the cell tower remotely in order to perform maintenance and repair. The flag associated with cell tower performance may be stored on a server comprising a plurality of historical operational information about the plurality of cell towers. This server may or may not be the same server where the application performing the analysis discussed herein is stored.

In response to a determination that a metric for a particular tower has failed this series of statistical tests, a control action may be executed. That is, the analysis discussed herein is employed to at least improve tower function by determining underperforming towers in real-time, as the cell tower performance occurs, based upon the KPI analysis discussed herein. In some embodiments, a single metric failure at step 4 may trigger these control actions, and in alternate embodiments, combinations of metric (for example, that constitute one or more KPIs) may trigger these controls. In an embodiment, the analysis in steps one through four above may be employed, and then the results compared to results from an analysis of at least one other metric or KPI for the same tower or for a cell tower within a predetermined radius of the cell tower discussed above. This comparison may be performed based upon a previously determined relationship between two or more metrics and a single tower, or between metrics associated with different towers, e.g., a previously determined relationship between tower underperformance.

In an embodiment, there may be control actions executed in response to a determination that a cell tower is underperforming based on the metric analysis. Thus, the systems and methods discussed herein may be employed to maintain cell towers by automatically executing at least one control action in response to a determination that a cell tower is underperforming.

FIG. 1 illustrates a system 100 configured to maintain telecommunications services by detecting and responding to underperforming cell towers in real time. As discussed herein, "real time" may be the term used to describe the updating of at least the short term table as data is received from cell towers, the data may be collected at periodic intervals and update at those intervals in the short term table. This is a functional description intended to reflect that the short term table is updated and the analysis is performed on "real time" data, that is, on current data received from cell towers at periodic intervals. In an embodiment, a server 102 comprises a processor 104 capable of executing an application 108 stored in a memory 106. The server 102 may comprise a database management system, including at least one short term baseline table 112 (short term table 112), and a long term baseline table 114 (long term table 114). It is appreciated that the tables 112 and 114 may also be referred to as databases or data stores, and may be SQL tables. In an embodiment, the application 108 comprises or in some embodiments accesses a plurality of custom queries 110. The plurality of custom queries 110 may comprise SQL operations designed to execute in the short term table 112 (which is a SQL database) while the short term table 112 continues to receive updated data from the plurality of cell towers 122 and 124. At least some of the custom queries 110 may be executed on the short term baseline table 112 while the table 112 is being updated. The databases, data stores, and tables discussed herein may comprise SQL databases, and the queries 110 and application 108 may execute on the short term table 112 while it is being updated. The short term table 112 may receive a plurality of updates at predetermined update intervals, for example, at intervals of 5 minutes, 10 minutes, 15 minutes, or another interval as appropriate for data collection. At periodic intervals (e.g., 3 minutes, 5 minutes, 7 minutes 10 minutes, 15 minutes, etc.), a plurality of cell towers represented by a first cell tower 122 and a second cell tower 124 in FIG. 1 may send this information by way of the network 120 to the server 102. It is appreciated that hundreds, thousands, tens of thousands, or more cell towers may be represented by towers 122 and 124.

The short term table 112 may receive data at periodic intervals from the cell towers 122, 124, and store that data for a predetermined period of time. That is, the data collected on a first day may be considered expired on a date after a predetermined period of time passes. Expired data may be transferred to the long term table 114 discussed below after expiration. This predetermined time period may be 7 days, 14 days, or another time period as appropriate for data analysis. In an embodiment, each row in the short term table is tracked and mirrored over to the long term table 114 prior to expiration at a predetermined interval. In this embodiment, if rows are modified in the short term table 112, the modifications are transferred to the long term table 114 as well. Thus, multiple SQL instances may be married, and low-level replication may be used so that each row in the short term table 112 is tracked and mirrored over to the long term table 114, when rows are changed, that also gets sent over to the long term table 114.

The long term table 114 may also be stored on the server 102. This long term table 114 may comprise information formerly stored in the short term table 112, and the long term table 114 may retain the data for a longer predetermined period of time than the data retained in the short term table 112. The long term table 114 may not be a real-time updating short term table like short term table 112, but rather may be a table that is updated as data expires from the short term table 112. The long term table 114 may not be continuously updated while at least one custom SQL sequence is executed, as with the short term table 112. Rather, the long term table 114 may be employed to develop a plurality of models 116 that may be stored in the memory 106 on the server 102. Data may be transferred from the short term table 112 to the long term table 114 after expiration, and the plurality of models 116 generated based off of the long term table 114 may be updated on a periodic basis.

In an embodiment, one purpose of the models 116 may be to track and trend data not only to determine real-time performance, but also to collect and store data over longer periods of time in order to determine thresholds, trends, process creep, and the relationship between tower performance among towers in a particular geographic region or of a particular model/configuration, as well as to determine the relationship of metrics for a single tower. In alternate embodiments, the server 102 may store the short term table 112 and the long term table 114 may be stored on a separate server (not pictured), and in some embodiments the plurality of models 116 may be stored on a separate server (not pictured) and may be the same server or a different server than where the long term table 114 is stored.

In an embodiment, a plurality of data from the plurality of cell towers including towers 122 and 124 are sent from the cell towers 122, 124, to the short term table 112 and analyzed by the application 108 to determine (1) at least one metric associated with the proper function of each cell tower; (2) a baseline to use for statistical analysis. The short term table 112 is configured to receive updates from the plurality of cell towers on a periodic basis, and is configured to store this data for a predetermined amount of time, after which the expired is transferred to the long term table 114 where it is stored for a second, longer period of time than it was stored in the short term table 112. The analysis that occurs by executing custom SQL sequences when the application 108 executes on the short term table occurs while the short term table is being updated, and is referred to as a non-atomic operation. Thus, the short term table 112 continues to receive data from the plurality of cell towers while the application 108 is executing.

In an embodiment, a first analysis of data in the short term table 112 may comprise a z-test to determine if a cell tower is performing within an expected range of performance as determined by previously established baselines associated with each metric for each cell tower. In an embodiment, part of the application's 108 execution comprises associating each entry in the table with a state, which may also be referred to as an indicator, so that the application 108 can determine the status of rows with respect to the analysis. For example, each entry in the short term table 112 (and in the long term table 114), is associated with a metric for a particular cell tower. As the application 108 analyzes an entry, the state, which may be represented by numeric, alphabetical, symbol, or combinations of data, is employed to determine if the real-time updating data, that continues to update during the initial analysis, has been analyzed, is unanalyzed, has seen modified since analysis, or has been deleted. The application 108 is configured to monitor the states of the entries and to determine if additional analysis is appropriate because, for example, entry number 1234 is analyzed, but then updated while the application 108 is executing. In that scenario, the entry 1234 is first associated with a state that indicates it has been analyzed, then the state is changed in response to the update, so the application 108 can include an analysis of the most recently updated data in the entry 1234. Thus, the application 108 executes on a live, real-time, dynamically updating database (the short term table 112) as the table 112 is being updated, and employs the states to determine row by row what data is to be analyzed in the initial analysis.

If this initial analysis, which may be a z-test, fails for at least one row/entry (metric) of the short term table, a second analysis may be performed on that metric. This second analysis may be a power test employed to determine if the metric that failed the z-test (e.g., if the analysis determines that the metric is outside of the expected statistical variation for that metric using a previously established baseline) by taking into account anomalies. For example, if Tower 61 is located in a rural area but near a concert/sporting venue, and Tower 88 is located in a business district that does not experience high traffic at night and on weekends, a concert near Tower 61 or a convention in the business district near Tower 88 may explain the z-test failure of a metric for either of those towers. This may be accomplished by comparing a portion of the data from the short term table 112 from a particular time period, day of the week, or a combination of time period and day of the week to data from that same time period/day to account for variations such as those discussed herein.

In an embodiment, if the power test does not indicate that the result from the z-test was an anomaly, the application 108 may employ a model of the plurality of models 116. The model employed may be the model associated with the metric in question, and the model may have been previously determined using the long term table 114. In an embodiment, the long term table 114 is updated on a periodic basis, but in contrast to the short term table 112 which is updated in real time periodically as new information is received from the plurality of cell towers, the long term table 114 is updated at a longer predetermined interval, and models are recalculated at periodic intervals using the data in the long term table 114. In an embodiment, the model may be employed to determine if a cell tower is underperforming by plugging in current data values of tower metrics from the first table and into the model inputs and calculating an expected value of an associated KPI (metric) using the model (e.g., perform a second z-test). This expected result may then be compared to the currently observed value of the KPI, and if it doesn't match, the cell tower may be identified as underperforming and in some cases the model may be recalculated.

If the application 108 determines that the results obtained from the analysis of the real time data fall outside of the expected results based on the model, the application may execute at least one control action. In an embodiment, the application may (1) recalculate the model, (2) recalculate the model and perform an additional model comparison, (3) update the data in the long term table and recalculate the model, and/or (4) indicate, for example using a flag, that the cell tower is underperforming. In some embodiments, the application 108 may execute at least one control action.

Control actions may be used alone or in combination, may vary by the type of metric failure (dropped calls, failure connection rates, set up time, throughput of handset, throughput of backhaul (e.g., from cell towers to core networks, call block rates, etc.), tower location, or technology associated with the cell tower. In an embodiment, the control actions executed in response to a determination that the metric in question indicates underperformance of the associated cell tower may include: (1) sending a notification that the cell tower is underperforming, (2) changing a flag associated with cell tower performance to indicate that the cell tower is underperforming and/or what other control actions have been executed, (3) taking action to dispatch or notify an on-site team, or (4) modifying the performance of the cell tower remotely in order to perform maintenance and repair. The flag associated with cell tower performance may be stored on a server that may or may not be the same server where the application performing the analysis discussed wherein is stored. In an embodiment, various analysis may be associated with an isolation level that is used to define the degree to which one transaction must be isolated from modifications to the data table or from other transactions.

Figure 2:
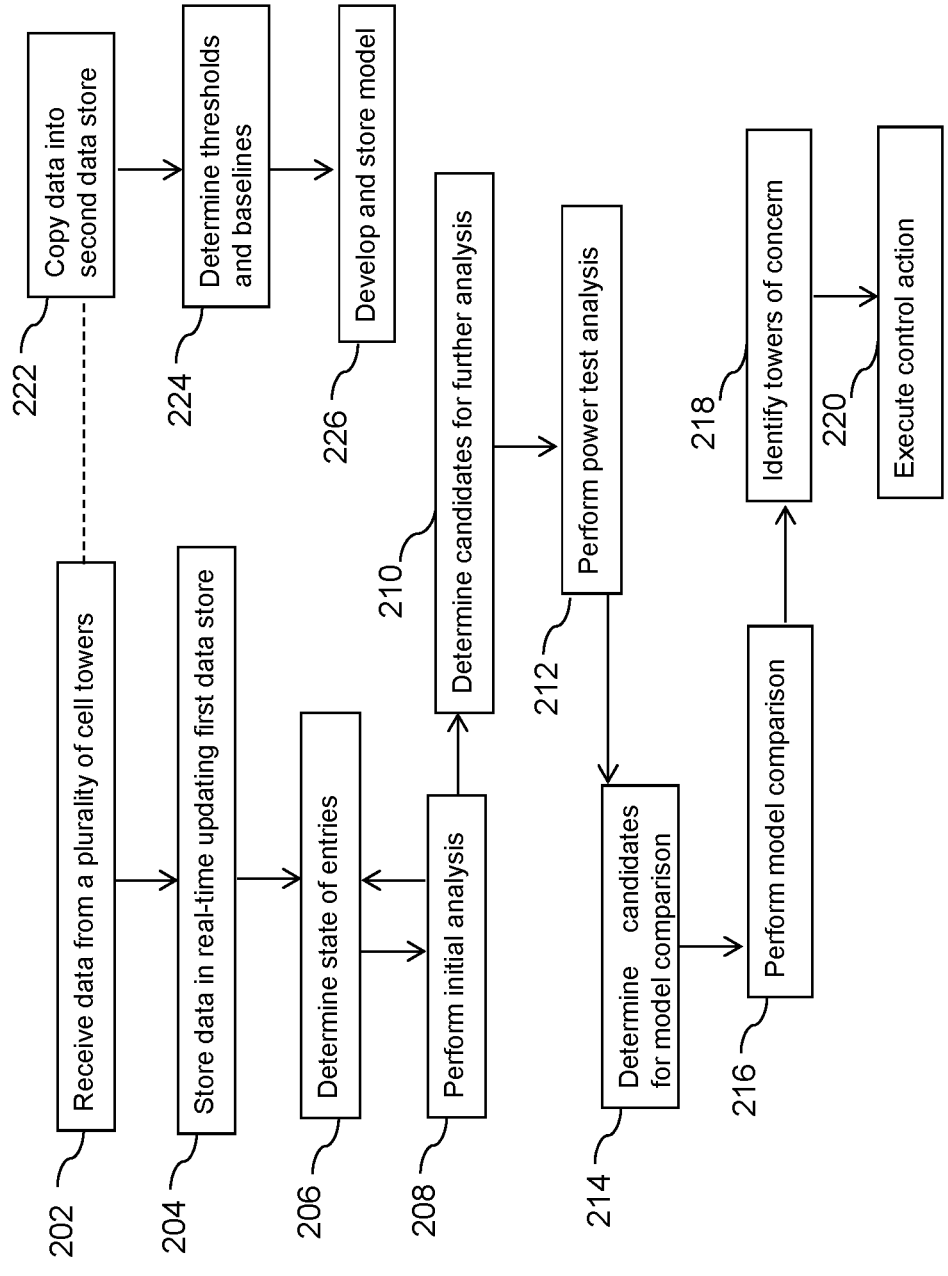
FIG. 2 illustrates a method of maintaining telecommunications services by detecting and responding to underperforming towers in real time.

FIG. 2 illustrates a method 200 of maintaining cell towers. At block 202, a plurality of data is received from a plurality of towers. The plurality of data received at block 202 may comprise operational, service, and other functional data from the cell tower, for metrics that may form the basis for key performance indicators such as dropped calls associated with the cell tower. In a separate step (not pictured) each cell tower's data is analyzed to determine the performance ranges (e.g., the normal, acceptable variation) for metrics for that tower, which may be the same, different, or overlap with KPIs with other towers. The plurality of data received at block 202 is the data for KPIs identified in that separate step.

In an embodiment, the data received at block 202 may be stored by at block 204 in a first table, which may be referred to as a short term table, database, or data store, similar to the short term table 112 in FIG. 1. The short term table 112 may be employed to store the data for a first period of time from the time it is uploaded. This period of time may be, for example, 7, 10, or 14 days. After the first period of time passes, the data that has been stored in the table for that length of time may be considered to be expired and may be transferred to a second table (long term 114 as in FIG. 1), where it may be stored for a longer second period of time, for example, 30, 45, or 60 days, and used to generate models for at least some metrics associated with each cell tower. In alternate embodiments, data is copied to the second table, discussed below, while it is still live (not expired) in the short term table 112.

At block 206, the application determines the state of the data in the short term database. This state may be determined by a flag or indicator associated with each row of data, where each row of data is associated with tower performance expressed as a metric. The state may comprise unanalyzed, analyzed, modified, or deleted, and may be indicated by a letter, number, symbol, or combination. An "unanalyzed" state may be associated with data that has not yet been analyzed (e.g., has not been previously analyzed), an "analyzed" state may be associated with data that has been previously analyzed, a "modified" state may be associated with data that has been modified since being analyzed, and a "deleted" state may indicate that the data was removed or has expired. At blocks 206 and 208, an iterative statistical analysis occurs where a custom SQL script (operation) executes on the short term table 112 while the short term table 112 continues to receive data at predetermined intervals (5 minutes, 10 minutes, 15 minutes, 20 minutes, etc.). As the analysis is performed, the application determines, row by row of the short term table 112, if rows have been analyzed, are unanalyzed (but may be analyzed), or are not to be analyzed (e.g., have been deleted or have expired). In some embodiments, the state of each analyzed row is set back to "unanalyzed" by the application 108 after the iterative analysis at blocks 206 and 208 is complete. At block 210, based on the analysis at block 208, the application determines candidates (e.g., metrics and the associated towers) for further analysis. In an embodiment, if the application 108 determines during this iterative analysis that a row previously analyzed has been deleted, that row is removed from the analysis.

In an embodiment, the further analysis at block 212 comprises performing a statistical power test on the metrics identified at block 210 in order to account for anomalies in the data. For example, if the initial analysis at block 208 determines that a first metric associated with a first tower has failed the test, for example, a z-test, the power test may be employed at block 212 to determine if this was an expected failure. For example, if the analysis at block 208 indicates that metric Y for Tower 88 is out of the expected range (e.g., has failed the z-test), the power test may be employed at block 212 to determine if the failure, for example, dropped calls, failure connection rates, set up time, throughput of handset, throughput of backhaul (e.g., from cell towers to core networks), or call block rates, was due to an event such as a concert or festival in the area that would increase traffic at Tower 88 beyond what would be considered "normal" statistical variation using the z-test. The power test compares more discrete intervals of time and/or days of the week and intervals of time, to determine if the z-test failure may be attributed to a reason other than cell tower underperformance.

At block 214, candidates (metrics) for a model comparison are determined based upon which metrics identified at block 210 fail the power test at block 212. The model employed at block 216 is generated from a second table that may be referred to as a long term database or data store 114, as discussed in FIG. 1. Turning to the model, which may be similar to the model(s) 116 discussed in FIG. 1, at block 222, when data expires from the short term table 112, the expired data is coped to the long term table 114, this database is used at block 224 to determine a plurality of baselines and thresholds employed in the analysis at least at block 208. In some embodiments, the baselines and thresholds may be determined based upon the data stored in the short term table 112, and in alternate embodiments the baselines and thresholds may be determined using the long term table 114. It is appreciated that the relationship between block 202 and block 222 is a dotted line because the copying of the data from the short term table 112 into the long term table 114 to generate the model may be done at various points after the data is received at block 102.

At block 226, a model for at least some metrics for each cell tower is generated based upon the long term table 114 and stored. Turning back to the use of the model. The models generated may be determined based upon a prior analysis of what metrics impact different cell towers, and what combinations of metrics impact different cell towers, and these identified metrics and combinations of metrics may be referred to as the key performance indicators (KPIs). At block 216, a model comparison is performed using the KPI(s) determined at block 214 to determine if the cell tower associated with the KPI is underperforming. The test at block 216 may comprise inputting the data used for the first z-test at blocks 206, 208, and 212 may be put into a model previously generated for the KPI/tower combination. The formula from the model is used to compute another expected value (another z-test) for the same data as analyzed at blocks 206, 208, and 212 using the value obtained from the model as opposed to the value obtained from the analysis of the short term table.

At block 218, if the z-test fails at block 216 the cell tower or towers of concern (e.g., those associated with KPIs that failed the z-test, the power test, and the model comparison), are identified based upon the failures of tests/analysis at blocks 208, 212, and 216. In some embodiments, the model established at 226 for the subject KPI may be regenerated based upon the most recent data stored in the short term table 112 that is copied and transferred (mirrored) to the long term table 114. In alternate embodiments, at block 220, at least one of a plurality of control actions is executed in response to a determination that the cell tower(s) is underperforming. As discussed above, the control actions executed may comprise sending a notification that the cell tower is underperforming, changing a flag associated with cell tower performance to indicate that the cell tower is underperforming and/or what other control actions have been executed, taking action to dispatch or notify an on-site team, or modifying the performance of the cell tower remotely in order to perform maintenance and repair.

Thus, by executing non-atomic operations in a SQL database that is updating in real-time, where the execution of the non-atomic operations occurs while the database is periodically receiving data, a real-time analysis of cell tower performance may be monitored so that control actions may be put in place prior to a more complicated failure, increased customer complaints, or other challenges that may occur when tower underperformance is not detected and corrected.

Figure 3:
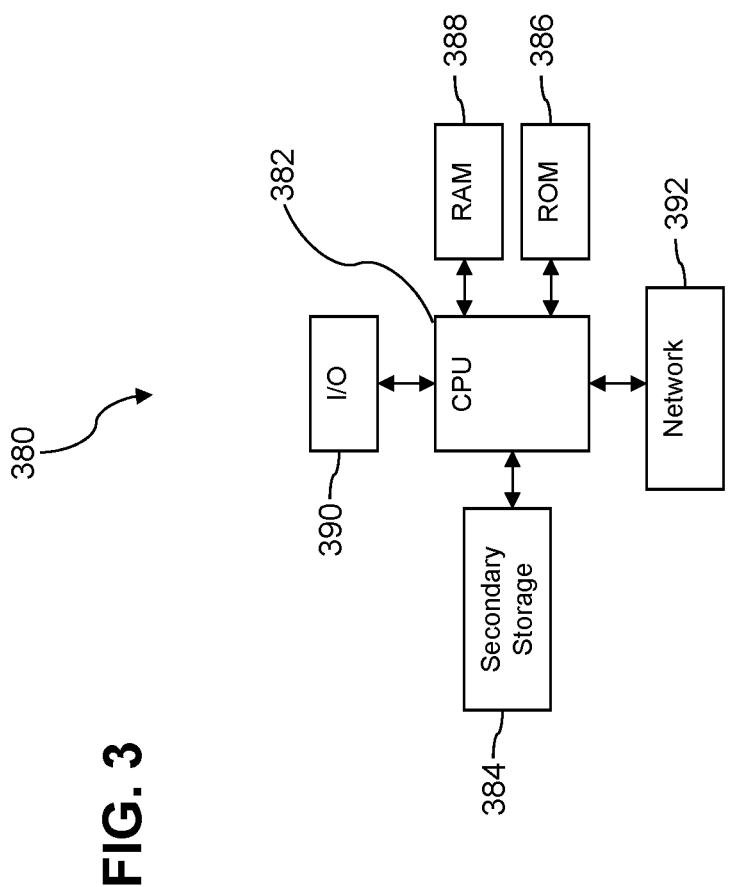
FIG. 3 illustrates an exemplary computer system suitable for implementing the several embodiments of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for maintaining a cell tower, comprising:

updating, by an application stored in a non-transitory memory of a server and executable by a processor, a short term table, by storing a plurality of data received from each cell tower of a plurality of cell towers, wherein each of the received pluralities of data is associated with a performance metric and stored as an entry in the short term table, wherein at least some performance metrics are associated with a key performance indicator (KPI) for a cell tower of the plurality of cell towers;

initiating, by the application, in the short term table, a first statistical analysis of at least some of the pluralities of data in the short term table, wherein initiating the first statistical analysis comprises performing a z-test and assigning a state to each entry stored in the short term table;

updating, by the application, the short term table during the first statistical analysis, wherein at least some of the updated data replaces data stored in the short term table after first statistical analysis is initiated;

completing, by the application, the first statistical analysis, during the updating of the short term table;
identifying, by the application, based on the completion of the first statistical analysis, at least some KPIs for a second analysis;
performing, by the application, the second statistical analysis on the at least some KPIs identified, wherein the second statistical analysis comprises a power test;
performing, by the application, based on the second statistical analysis, a third statistical analysis comprising a second z-test on at least one KPI of the at least some KPIs using a model, wherein the model is generated based on a long term table, wherein the long term table comprises data associated with the plurality of cell towers, and wherein the inputs used for the z-test and the power test are input into the model and the second z-test is performed on the results;
determining, by the application, based on the third statistical analysis, when the cell tower associated with the at least one KPI is underperforming; and
executing, in response to a determination that the cell tower is underperforming, at least one control action that includes one or more of:
sending a notification that the underperforming cell tower is underperforming,
changing a flag associated with underperforming cell tower performance,
notifying an on-site team, wherein the on-site team is located in proximity to the underperforming cell tower, or
modifying the performance of the underperforming cell tower remotely.

2. The method of claim 1, further comprising copying, by the application, from the short term table to the long term table, a plurality of expired data, wherein data in the short term table expires after a predetermined time period.

3. The method of claim 2, wherein the data in the long term table expires after a predetermined time period that is greater than the predetermined time period for expiration of data in the short term table.

4. The method of claim 1, wherein the state comprises at least one of unanalyzed, analyzed, modified, or deleted, and wherein the application is configured to reset the state during at least the initial statistical analysis.

5. The method of claim 1, further comprising updating, by the application, the short term table during the second statistical analysis, wherein at least some of the updated data replaces data stored in the short term table after the second statistical analysis is initiated.

6. A system for maintaining a cell tower, comprising:
a server;
a non-transitory memory of the server;
a processor of the server; and
an analysis application stored in the non-transitory memory and executable by the processor to:
receive pluralities of performance data from each of a plurality of cell towers;
store the received performance data as entries in a short term table, wherein the pluralities of performance data are associated with a plurality of performance metrics of the plurality of cell towers and expire a predetermined amount of time after being stored, and wherein at least some of the plurality of performance metrics are associated with a key performance indicator (KPI) of a cell tower of the plurality of cell towers;
initiate a first statistical analysis on at least some of the pluralities of performance data, wherein the first statistical analysis comprises a z-test;
update, after the z-test is initiated, the short term table during the z-test, at the predetermined intervals as additional performance data is received from the plurality of cell towers, wherein at least some of the updated short term table is analyzed during the z-test, and wherein at least some of the updated data replaces data stored in the short term table when the z-test is initiated;
complete, during the updating of the short term table, the z-test;
determine, based on the z-test, a subset of the plurality of performance metrics;
perform, subsequent to the completion of the first statistical analysis, a second statistical analysis on the subset of the plurality of performance metrics;
perform, based on the second statistical analysis, a third statistical analysis comprising a second z-test on at least one performance metric of the subset of the plurality of performance metrics using a model previously generated for the at least one performance metric, wherein the inputs used for the z-test are input into the model to perform the second z-test;
determine, based on the second z-test, that the cell tower associated with the at least one performance metric is underperforming; and
execute, in response to the determination that the cell tower is underperforming, at least one control action that includes one or more of:
sending a notification that the underperforming cell tower is underperforming,
changing a flag associated with underperforming cell tower performance,
notifying an on-site team, wherein the on-site team is located in proximity to the underperforming cell tower, or
modifying the performance of the underperforming cell tower remotely.

7. The system of claim 6, wherein the analysis application associates each entry in the short term table with a state upon initiation of the first statistical analysis.

8. The system of claim 6, wherein the analysis application at least one of detects and modifies at least some states associated with each entry in the short term table.

9. The system of claim 6, wherein the short term table is updated during the second statistical analysis.

10. The system of claim 6, wherein the application is configured to assign a state to each entry prior to at least the first statistical analysis, wherein the state comprises at least one of unanalyzed, analyzed, modified, or deleted, and wherein the application is configured to reset the state upon completion of the z-test.

11. A method for maintaining a cell tower, comprising:
performing, by an application stored in a non-transitory of a server and executable by a processor, a first statistical analysis comprising a first z-test on a plurality of data stored in a short term table on the non-transitory memory, wherein the application executes on the short term table, and wherein the plurality of data comprises key performance indicators (KPIs) received from a plurality of cell towers and associated with performance of the plurality of cell towers;
determining, by the application, based on the first z-test, a subset of the KPIs;

performing, by the application, a second statistical analysis on the subset of the KPIs, wherein the short term table receives additional pluralities of data during the second statistical analysis;

performing, by the application, based on the second statistical analysis, a third statistical analysis comprising a second z-test on at least one KPI of the subset of KPIs using a model associated with the at least one KPI, wherein the model is generated based on a long term table, and wherein the long term table comprises a plurality of data associated with cell tower performance of a cell tower associated with the at least one KPI;

determining, by the application, based on the second z-test, that the cell tower associated with the at least one KPI is underperforming; and executing, by the application, in response to the determination that the cell tower is underperforming, at least one control action that includes one or more of:
- sending a notification that the underperforming cell tower is underperforming,
- changing a flag associated with underperforming cell tower performance,
- notifying an on-site team, wherein the on-site team is located in proximity to the underperforming cell tower, or
- modifying the performance of the underperforming cell tower remotely.

12. The method of claim 11, wherein performing the first z-test comprises executing a plurality of non-atomic SQL operations.

13. The method of claim 11, further comprising receiving, by the application, pluralities of data from the pluralities of cell towers at predetermined intervals, and storing the pluralities of data in the short term table.

14. The method of claim 11, further comprising recalculating the model associated with each KPI for each cell tower at predetermined intervals.

15. The method of claim 11, further comprising recalculating the model in response to a determination that the cell tower associated with the KPI is not underperforming.

16. The method of claim 11, wherein the short term table stores data for a first predetermined period of time, and wherein the data expires after the first predetermined period of time and is removed from the short term table.

17. The method of claim 16, wherein the long term table comprises data associated with the plurality of cell towers, and wherein the data in the long term table is stored for a second predetermined period of time.

18. The method of claim 17, wherein the second predetermined period of time is greater than the first predetermined period of time.

19. The method of claim 17, further comprising assigning, by the application, to each row in the short term table, a state, wherein the state comprises at least one of unanalyzed, analyzed, modified, or deleted.

* * * * *